United States Patent
Brachert et al.

(10) Patent No.: US 7,353,799 B2
(45) Date of Patent: Apr. 8, 2008

(54) METHOD FOR OPERATING AN INTERNAL COMBUSTION ENGINE

(75) Inventors: Goetz Brachert, Stuttgart (DE); Ruediger Herweg, Esslingen (DE); Kai Kanning, Stuttgart (DE); Matthias Pfau, Ludwigsburg (DE); Jochen Schaeflein, Stuttgart (DE); Hans-Juergen Weimann, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/573,489

(22) PCT Filed: Sep. 2, 2004

(86) PCT No.: PCT/EP2004/009760

§ 371 (c)(1),
(2), (4) Date: Dec. 13, 2006

(87) PCT Pub. No.: WO2005/038210

PCT Pub. Date: Apr. 28, 2005

(65) Prior Publication Data

US 2007/0169742 A1    Jul. 26, 2007

(30) Foreign Application Priority Data

Sep. 25, 2003    (DE)    ................. 103 44 427

(51) Int. Cl.
*F02B 3/00*    (2006.01)
*F02D 41/38*    (2006.01)

(52) U.S. Cl. ..................................... 123/299

(58) Field of Classification Search ............. 123/299, 123/295, 298, 305; 701/103–105

See application file for complete search history.

(56) References Cited

U.S. PATENT DOCUMENTS

| | | | | |
|---|---|---|---|---|
| 6,390,056 | B1 * | 5/2002 | Hertzberg et al. | 123/295 |
| 6,508,228 | B2 * | 1/2003 | Knoll | 123/299 |
| 2001/0015192 | A1 | 8/2001 | Urushihara et al. | |
| 2002/0020388 | A1 | 2/2002 | Wright et al. | |

FOREIGN PATENT DOCUMENTS

| | | |
|---|---|---|
| DE | 195 19 663 A1 | 5/1996 |
| DE | 198 18 569 A1 | 11/1998 |
| DE | 198 52 552 C2 | 10/2000 |
| EP | 0 947 684 A2 * | 10/1999 |
| EP | 1 048 833 A2 | 11/2000 |
| EP | 1 052 391 A2 | 11/2000 |
| EP | 1 138 896 A2 | 4/2001 |
| FR | 2 835 880 A1 | 8/2003 |
| JP | 8-170560 A * | 7/1996 |
| JP | 2000-110642 A * | 4/2000 |

OTHER PUBLICATIONS

International Search Report dated Jan. 19, 2005 Including an English translation of the pertinent portion (five (5) pages).

* cited by examiner

*Primary Examiner*—Hieu T. Vo
(74) *Attorney, Agent, or Firm*—Crowell & Moring LLP

(57) ABSTRACT

Disclosed is a method for operating an internal combustion engine, wherein fuel is injected in a pre-injection and main injection process. According to the invention, pre-injection occurs in the intermediate compression stroke of the internal combustion engine. Main injection is carried out in an intake synchronous manner. The invention can be used for internal combustion engines, particularly for passenger cars and commercial vehicles.

8 Claims, 2 Drawing Sheets

METHOD FOR OPERATING AN INTERNAL COMBUSTION ENGINE

This application claims priority from PCT Application No. PCT/EP2004/009760 filed on Sep. 2, 2004, which claims priority to German Application No. 103 44 429.7 filed on Sep. 25, 2003, the entire disclosure of which is incorporated herein by reference.

BACKGROUND AND SUMMARY OF THE INVENTION

The present invention relates to a method for operating an internal combustion engine.

By way of example, DE 195 19 663 A1 has disclosed a method for operating an internal combustion engine with spontaneous ignition, in which in a first stage a homogenous, precompressed fuel/air mix which is not suitable for spontaneous ignition is provided in the working space, and in a second stage an additional quantity of the same fuel is injected into the working space in order to bring about the spontaneous ignition. In this case, the fuel/air mix is prepared by means of external mix formation and introduced into the working space, where it is compressed to close to the spontaneous ignition point. The injection of the additional quantity of fuel in the second stage takes place in finely atomized form, avoiding contact with the walls, so as to form a mix cloud in which, on the one hand, the fuel/air ratio is no greater than the stoichiometric mixing ratio and in which, on the other hand, the spontaneous ignition condition is achieved.

Furthermore, DE 198 52 552 C2 has disclosed a method for operating a four-stroke internal combustion engine which, at part-load, forms a lean base mix from air, fuel and retained exhaust gas and, at full load, forms a stoichiometric mix. At part load, compression ignition takes place, whereas at full load spark ignition takes place. Furthermore, mechanically controlled exhaust-gas retention with switchable valve closure overlap and exhaust gas throttling is provided. An activation injection can be carried out into the retained exhaust gas. The quantity of retained exhaust gas, with the valve closure overlap switched on, is controlled or preset as a function of the engine speed and engine load by an exhaust-gas throttle valve which is active for all the combustion chambers. The pressure when the intake members open into the individual combustion chambers is evened out by a cylinder-selective, cylinder-consistent activation injection.

A method for operating a four-stroke, reciprocating-piston internal combustion engine is also known from DE 198 18 569 C2. It is characterized by a homogenous, lean base mix of air, fuel and retained exhaust gas and by compression ignition and direct injection of the fuel into the combustion chamber. The volume of the combustion chamber changes cyclically. The combustion chamber can be filled with fresh gas through at least one intake member, while the combustion exhaust gases can be at least partially expelled through at least one exhaust member. In the part-load range and in the lower full-load range, the internal combustion engine is operated with compression ignition and preferably mechanically controlled exhaust-gas retention, whereas in the full-load range and high part-load range it is operated on the Otto cycle.

One drawback of the methods known from the above-mentioned documents is in particular that during the compression ignition of homogenous mixes, the start of combustion and the release of heat cannot be controlled. The control of the exhaust-gas quantity by exhaust-gas retention and exhaust-gas suck-back are expensive and difficult to realize.

By contrast, an object of the present invention is to provide a method for operating an internal combustion engine in which the reaction state of the mix can be influenced in a targeted way.

This object has been achieved by providing the mass of fuel to be injected is divided into a preinjection and a main injection, the preinjection taking place into the intermediate compression stroke and the main injection taking place synchronously with the induction. This type of division of the injected fuel masses allows the combustion position to be influenced in a targeted way, because this preinjection into the intermediate compression stroke can be used to influence the temperature and composition of the working gas and therefore the reaction state of the mix.

In a further configuration of the invention, the mass ratio of the fuel mass injected in the preinjection and the fuel mass injected in the main injection is divided according to the operating state of the internal combustion engine. In a currently preferred embodiment of the invention, the division of the injected fuel masses into preinjection and main injection is approximately 50:50.

In a further configuration of the invention, the valve closure overlap between the intake and exhaust valves remains constant during load changes.

Furthermore, it is advantageous if the injection point of the preinjection is dependent on the rotor speed and the injection pressure.

BRIEF DESCRIPTION OF THE DRAWINGS

An embodiment of the present invention is described in greater detail on the basis of the drawings, in which.

DETAILED DESCRIPTION OF THE DRAWINGS

Figure 1:
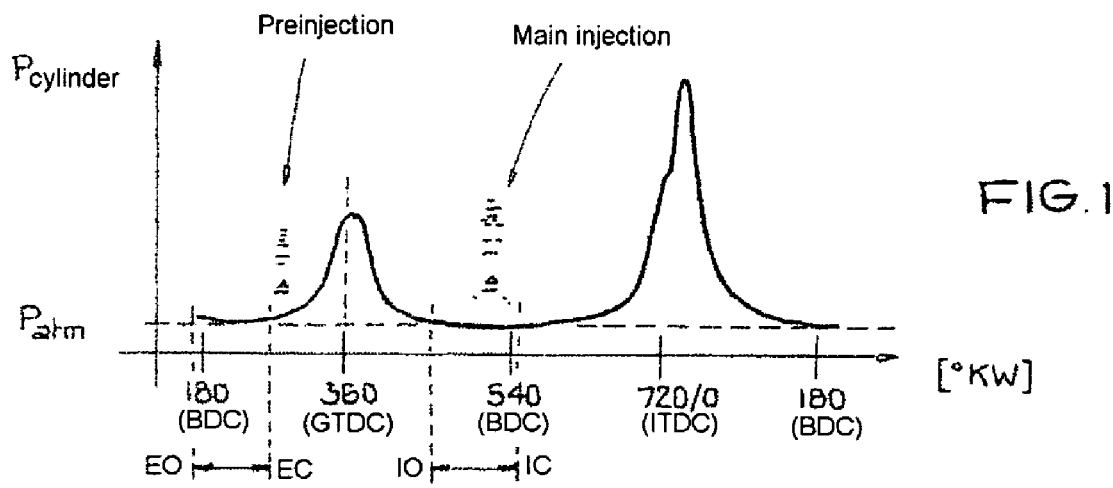
FIG. 1 is a graph explaining the division of the injection quantity between preinjection and induction-synchronous main injection.

The driving factor behind research and development in internal combustion engines is the desire to constantly improve fuel consumption while, at the same time, reducing untreated emission levels. In the case of externally ignited internal combustion engines, in particular alternative load control methods are recommended to increase the part-load efficiency. The most important development trends are the stratified direct injector, which with the aid of quality control moves the externally ignited internal combustion engines closer to the spontaneously igniting internal combustion engines (diesel engine), and the variable valve gear combined with residual gas strategies, which are intended to limit charge exchange losses.

Both methods theoretically promise major benefits but are thwarted in one case by the expensive aftertreatment of the exhaust gas from the superstoichiometric mix and in the other case by the limited residual gas compatibility of externally ignited internal combustion engines. The ideal is a link between these two methods: a quality-controlled internal combustion engine with high residual gas content and spontaneous ignition, which on account of homogenous combustion in superstoichiometric operation emits very little if any nitrogen oxide.

One property of homogeneous combustion methods is the spontaneous ignition time, which is determined by the temperature or mix composition. If the required charging temperatures are realized with the aid of exhaust-gas retention, more specifically by way of the parameters exhaust-gas temperature and quantity, the result is that the combustion position of cycle n is dependent on the preceding cycle (n-1); the required spontaneous ignition temperature is not reached in extreme circumstances. The combustion position for its part is the determining factor for the target variables of the internal combustion engine and therefore must have values which are defined as a function of load and engine speed.

An object of the present invention is to find ways of implementing the changes in exhaust-gas quantity and temperature which are required in the event of a change in operating point within the part-load range covered by the chamber ignition combustion without adversely affecting the combustion.

Exhaust-gas retention can in principle be achieved with the aid of suitable control times. This requires firstly early closing of the exhaust valve, in order to keep the required quantity of residual exhaust gas in the combustion chamber of the internal combustion engine. To prevent the hot exhaust gas from flowing back into the induction pipe, with ensuing cooling effects and charge losses, at the same time the intake valve is opened later. However, this concept cannot be applied to conventional, externally ignited internal combustion engines without further measures.

If this valve closure overlap is made sufficiently variable, the first control concept results for this form of providing the required temperature. The requirement for an unaffected high-pressure part and therefore optimum charging in this case, however, presupposes the use of a fully variable valve gear, in which opening time and closing time can be adjusted independently of one another.

Returning to the conventional camshaft, the setting of a defined exhaust-gas retention rate remains the task of the camshaft actuators which are already in widespread series use. As an undesirable side-effect, with a rigid cam contour, the angle at which the valve opens changes with the angle at which the valve closes, which leads to charging and efficiency losses and not least to a restricted operating range in terms of load and engine speed.

In addition to the control of the temperature at the end of compression with the aid of the exhaust-gas retention rate or quantity, the use of the direct injection and the operation of the internal combustion engine with excess air also influences the working gas temperature and/or the mix composition of the fuel. The effect of the direct injection can in this case be divided into two mechanisms: firstly, a thermal effect, which provides an increase in the exhaust-gas temperature as a result of the conversion of the pre-injected fuel, and secondly the occurrence of a preconditioning of the fuel, which increases the reactivity of the latter and therefore influences the integral ignition delay.

With the restricted variability and dynamics of the mechanical valve gear with a fixed cam contour, the injection point or the division of the injection quantity between various injection points becomes the most important parameter in the control of the combustion position. FIG. 1 illustrates the division of the injection quantity between a preinjection and an induction-synchronous main injection by way of example.

The valve closure overlap in this case allows an injection prior to the gas exchange TDC. The main fuel quantity continues to be introduced synchronously with the induction.

Figure 2:
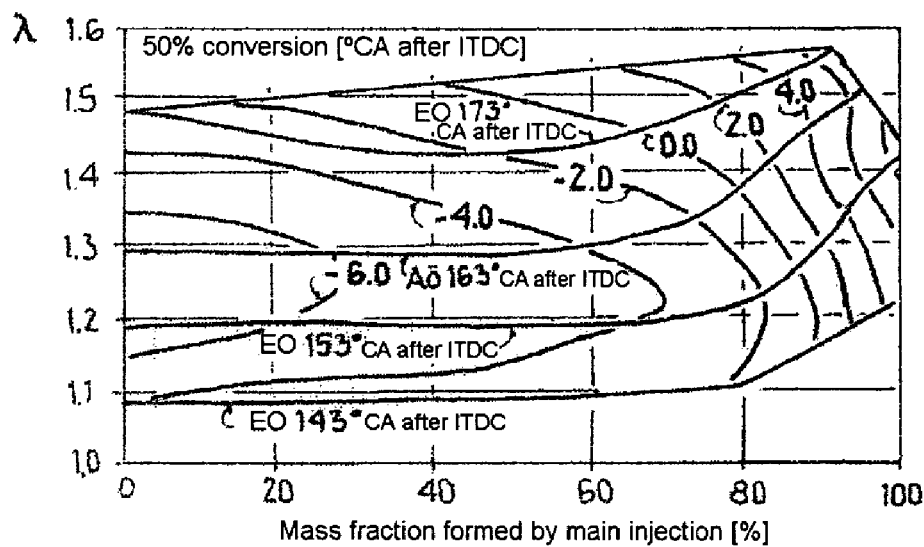
FIG. 2 is a graph illustrating the combustion position as a function of the injection quantity division and the air/fuel ratio.

FIG. 2 shows the way in which the combustion position is dependent on the mentioned injection division. The test was carried out at a reference point (2000 rpm, approx. 3 bar pmi) for various valve closure overlaps, which were kept constant over each variation. In this context, dashed lines denote constant exhaust control times. If one of these lines is followed, the result, in the optimum situation, is a shift in the combustion position by over 10° crank angle simply by changing the division. Moreover, with a constant intake and exhaust phase position, higher air/fuel ratios are reached with a smaller preinjected fuel quantity.

Figure 3:
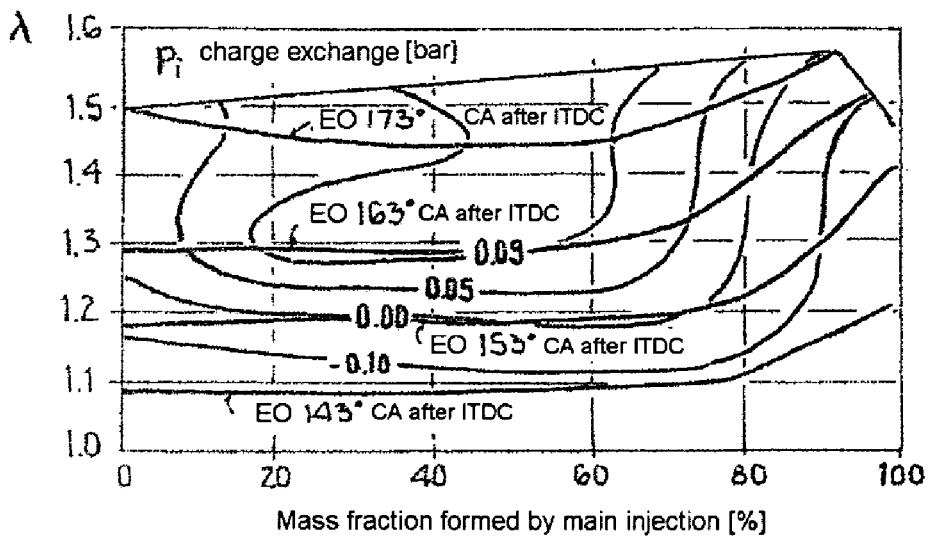
FIG. 3 is a graph illustrating the charge exchange mean effective pressure as a function of the injection quantity division and the air/fuel ratio.

The changes in air/fuel ratio result from a change in the intake fresh air mass, because the total injection quantity is kept constant. The shift in the combustion position is therefore closely associated with the operations which take place in the charge exchange loop. A glance at the charge exchange mean effective pressure in FIG. 3, measured from BDC to BDC, shows that given an approximately even division in the injection quantity between preinjection and main injection and high air/fuel ratios, positive values are obtained for the charge exchange work, even though the latter ought actually to be negative on account of induction, exhaust and wall heat losses. The injection of the fuel into the hot exhaust gas, which at the gas exchange TDC has a sufficiently high temperature level for spontaneous ignition and moreover is equipped with residual oxygen on account of the superstiochiometric operation, allows conversion to be assumed.

Figure 4:
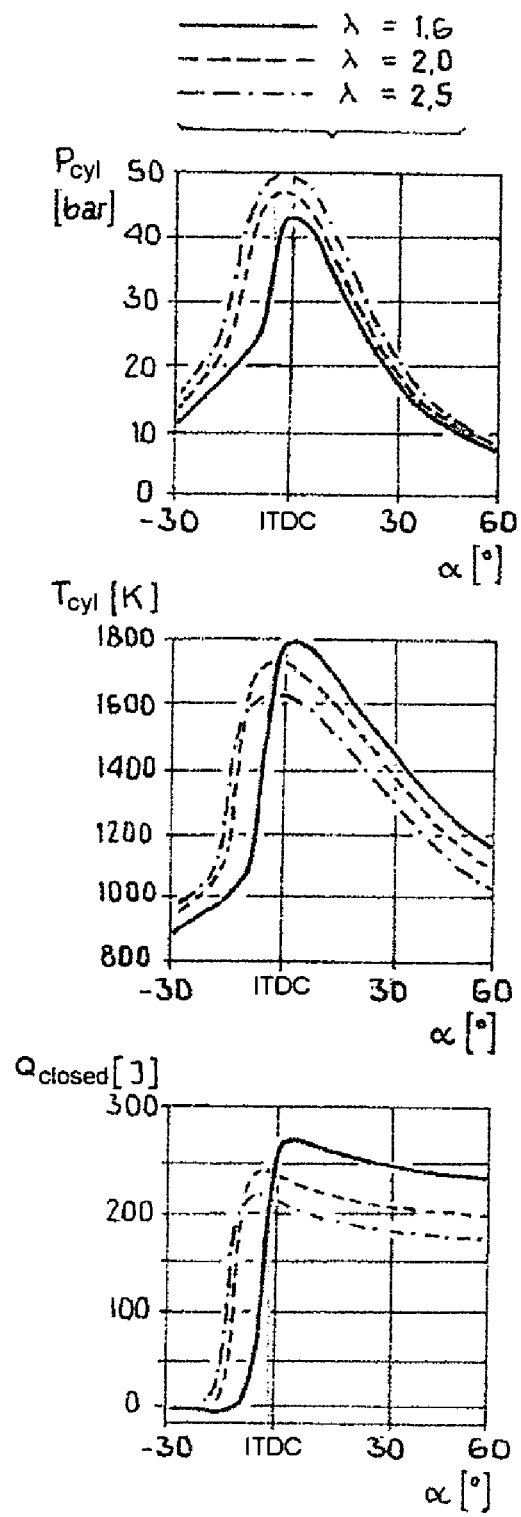
FIG. 4 are graphs showing the pressure, temperature and heating curve in the ignition and gas exchange TDC as a function of the air/fuel ratio.
Figure 4:
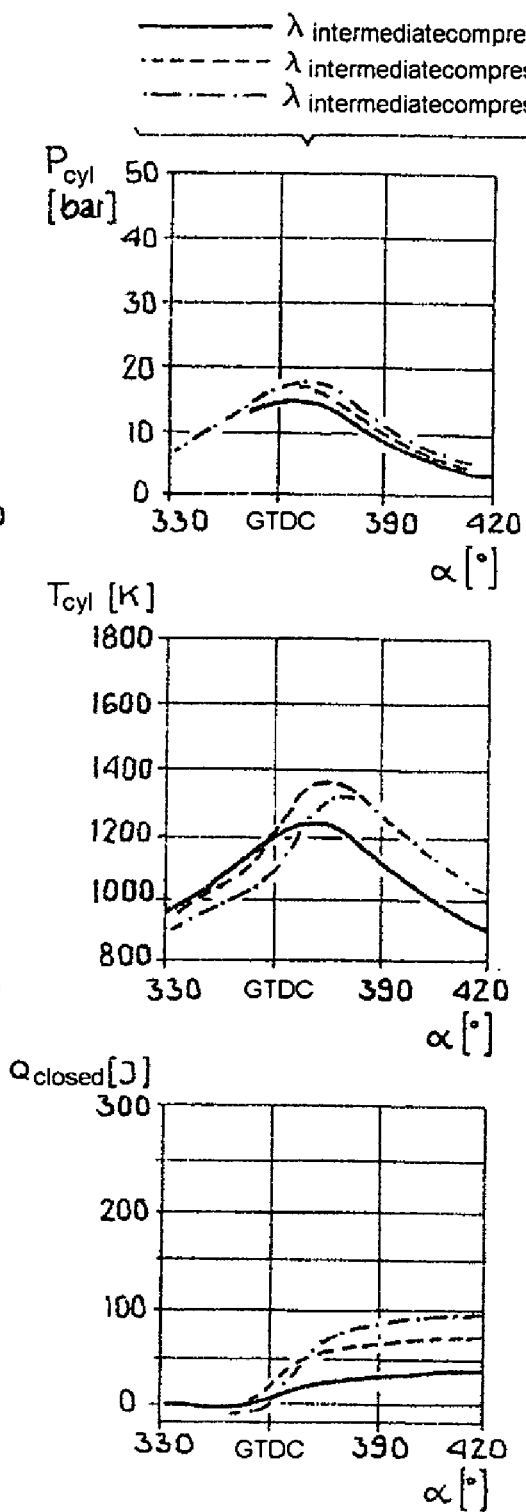

Conclusions as to the mechanisms of this conversion can be taken from FIG. 4. Starting from the point with the maximum charge exchange work from the engine map shown above with a division of 50:50 and $\lambda$=1.4, the air/fuel ratio $\lambda$ was increased by supercharging.

First of all, in the non-supercharged state, the conversion can be recognized in the asymmetric pressure and temperature curve. Both maxima lie after the top dead center. If a heating law at the GTDC is formed using mass calculations according to fundamental thermodynamic equations, a release of heat will be revealed. If the degree of charging and therefore the residual air content in the exhaust gas is now increased in steps, the degree of conversion at the charge exchange TDC rises despite otherwise constant boundary conditions, which implies a lack of oxygen. Despite the excess air generated in this way, not all of the preinjected fuel mass can be converted. The preinjection takes place approximately 60° CA before the gas exchange TDC, i.e. in this case mix formation problems and even the formation of carbon particulates have to be assumed. However, these carbon particulates are oxidized again in the main conversion. An improvement in the degree of conversion in the intermediate compression leads to an increase in the temperature and pressure of the retained exhaust gas. The increase in pressure even when the intake valve is opened also explains the drop in the air/fuel ratio with large preinjection quantities in the situation shown above. This higher temperature level which is now required leads to an early shift in the combustion. However, since a proportion of the fuel, which becomes ever greater according to the degree of charging, is already being burnt at the GTDC, the main conversion is always lower. The exhaust-gas temperature therefore drops and in turn influences the conversion in the intermediate compression.

The invention claimed is:

1. A method for operating a four-stroke internal combustion engine comprising:
    injecting fuel directly into at least one combustion chamber of the internal combustion engine, the volume of which changes cyclically,
    supplying fresh gas through at least one intake valve and discharging combustion exhaust gas through at least one exhaust valve,
    at part-load, forming a lean base mix of air, fuel and retained exhaust gas, and at full load forming a stoichiometric mix,
    having compression ignition take place at part-load and spark ignition take place at full load, and
    providing the fuel quantity as a preinjection and a main injection, wherein the fuel in the preinjection is injected into the intermediate compression stroke of the internal combustion engine, and the main injection takes place synchronously with the induction.

2. The method as claimed in claim 1, wherein a mass ratio of the fuel mass injected in the preinjection and a fuel mass injected in the main injection is divided according to an operating state of the internal combustion engine.

3. The method as claimed in claim 2, wherein in a valve closure overlap between the at least one intake valve and the at least one exhaust valve is invariable during load change.

4. The method as claimed in claim 3, wherein an injection point of the preinjection is dependent on engine speed and injection pressure.

5. The method as claimed in claim 2, wherein the division of the injected fuel masses into preinjection and main injection is approximately 50:50.

6. The method as claimed in claim 5, wherein an injection point of the preinjection is dependent on engine speed and injection pressure.

7. The method as claimed in claim 2, wherein an injection point of the preinjection is dependent on engine speed and injection pressure.

8. The method as claimed in claim 1, wherein an injection point of the preinjection is dependent on engine speed and injection pressure.

* * * * *